US012671486B2

(12) United States Patent　　　　(10) Patent No.: US 12,671,486 B2
Zheng et al.　　　　　　　　　　　　(45) Date of Patent: Jun. 30, 2026

(54) TECHNIQUES FOR MITIGATING REDUNDANT BEAM FAILURE RECOVERY MEDIUM ACCESS SIGNALING

(71) Applicant: QUALCOMM Incorporated, San Diego, CA (US)

(72) Inventors: Ruiming Zheng, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 17/997,620

(22) PCT Filed: Jul. 3, 2020

(86) PCT No.: PCT/CN2020/100050
§ 371 (c)(1),
(2) Date: Oct. 31, 2022

(87) PCT Pub. No.: WO2022/000446
PCT Pub. Date: Jan. 6, 2022

(65) Prior Publication Data
US 2023/0180326 A1　Jun. 8, 2023

(51) Int. Cl.
H04B 7/06　　　(2006.01)
H04W 24/04　　(2009.01)
(Continued)

(52) U.S. Cl.
CPC ........ H04B 7/06964 (2023.05); H04W 24/04 (2013.01); H04W 72/046 (2013.01); H04W 72/21 (2023.01); H04W 76/18 (2018.02)

(58) Field of Classification Search
CPC ... H04W 76/18; H04W 72/21; H04W 72/046; H04W 24/04; H04B 7/0695; H04B 7/06964
See application file for complete search history.

(56) References Cited

U.S. PATENT DOCUMENTS 11,184,080 B2　11/2021　Nagaraja et al.
12,483,984 B2 *　11/2025　Zhou ..................... G06F 1/3209
(Continued)

FOREIGN PATENT DOCUMENTS

CN　　108811092 A　　11/2018
CN　　110022613 A　　7/2019
(Continued)

OTHER PUBLICATIONS

ASUSTEK: "SCell BFR Regarding Scell Deactivation", 3GPP TSG-RAN WG2 Meeting #109-e, R2-2001600, 3rd Generation Partnership Project, Mobile Competence Centre, 650, Route Des Lucioles, F-06921 Sophia-Antipolis Cedex, France, vol. RAN WG2, No. e-meeting, Feb. 24, 2019-Mar. 6, 2019, Feb. 14, 2020, XP052356750, 4 pages, sections 1-4.
(Continued)

*Primary Examiner* — Jasper Kwoh
(74) *Attorney, Agent, or Firm* — Harrity & Harrity, LLP

(57)　　　　　ABSTRACT

Various aspects of the present disclosure generally relate to wireless communication. In some aspects, a user equipment may determine that a first beam failure recovery (BFR) has been triggered; determine BFR information associated with the BFR; determine whether at least part of the BFR information has not been transmitted since a second BFR was triggered; and transmit, based at least in part on the determination that the BFR has been triggered and the determination that at least part of the BFR information as not been transmitted since a second BFR was triggered, a BFR message including the BFR information. Numerous other aspects are provided.

35 Claims, 12 Drawing Sheets

(51) Int. Cl.
    *H04W 72/044*      (2023.01)
    *H04W 72/21*      (2023.01)
    *H04W 76/18*      (2018.01)

(56) References Cited

U.S. PATENT DOCUMENTS

| | | | | |
|---|---|---|---|---|
| 2020/0350973 | A1* | 11/2020 | Cirik | H04W 72/1263 |
| 2021/0029724 | A1* | 1/2021 | Tsai | H04W 28/0278 |
| 2021/0159967 | A1* | 5/2021 | Cirik | H04B 7/088 |
| 2021/0234601 | A1* | 7/2021 | Awadin | H04W 74/0808 |
| 2021/0266810 | A1* | 8/2021 | Koskela | H04W 36/06 |
| 2021/0377852 | A1* | 12/2021 | Zhou | H04W 52/0235 |
| 2021/0399784 | A1* | 12/2021 | Deghel | H04W 80/02 |

FOREIGN PATENT DOCUMENTS

| | | | |
|---|---|---|---|
| JP | 2021502728 | A | 1/2021 |
| JP | 2022501979 | A | 1/2022 |
| WO | 2019033072 | A1 | 2/2019 |
| WO | 2019051362 | A1 | 3/2019 |
| WO | 2019070437 | A1 | 4/2019 |
| WO | 2019100972 | A1 | 5/2019 |
| WO | 2019135654 | A1 | 7/2019 |
| WO | 2019137223 | A1 | 7/2019 |
| WO | 2020057979 | A1 | 3/2020 |
| WO | 2020063757 | A1 | 4/2020 |

OTHER PUBLICATIONS

Qualcomm Incorporated: "Cancellation the Pending BFR SR", 3GPP TSG-RAN WG2 Meeting #109bis-e, R2-2003253, 3rd Generation Partnership Project, Mobile Competence Centre, 650, Route Des Lucioles, F-06921 Sophia-Antipolis Cedex, France, vol. RAN WG2, No. Electronic, Apr. 20, 2020-Apr. 30, 2020, Apr. 10, 2020, XP052354222, 5 pages, sections 2, 5.

SAMSUNG: "Issues for Beam Failure Recovery", 3GPP TSG-RAN2 Meeting #109bis Electronic, R2-2002557, Apr. 20-Apr. 24, 2020, 7 Pages, Section 2 and 5.

Supplementary European Search Report—EP20942511—Search Authority—Munich—Mar. 14, 2024.

Taiwan Search Report—TW110124367—TIPO—Feb. 27, 2025.

International Search Report and Written Opinion—PCT/CN2020/100050—ISA/EPO—Mar. 25, 2021.

SAMSUNG: "Summary of Proposed Corrections (AI 6.16.3)", 3GPP Draft, 3GPP TSG-RAN2 Meeting #109bis Electronic, R2-2003795, 3rd Generation Partnership Project (3GPP), Mobile Competence Centre, 650, Route Des Lucioles, F-06921 Sophia-Antipolis Cedex, France, vol. RAN WG2, No. Electronic, Apr. 20, 2020-Apr. 24, 2020 Apr. 17, 2020 (Apr. 17, 2020), XP051876582, 12 Pages, pp. 1-4, 2.2 SR Aspects pp. 9-10, 2.10 Further Clarifications on the DL MAC CEs, Sections 1-3.

Sharp, et al., "Discussion on Pending BFR SR Upon SCell Deactivation", R2-2002605, 3GPP TSG-RAN WG2 Meeting #109bis Electronic, Electronic, Apr. 20-Apr. 30, 2020, Apr. 30, 2020 (Apr. 30, 2020) Sections 1-3, pp. 1-3.

LENOVO., et al., "Remaining Issues on Multi-beam Operation", 3GPP TSG RAN WG1 #101, R1-2003820, e-Meeting, May 25-Jun. 5, 2020, 4 Pages, May 25, 2020, Section 2.1.

NTT Docomo Inc: "Discussion on Multi-beam Enhancement", 3GPP TSG RAN WG1 Ad-Hoc Meeting 1901, R1-1900979, Taipei, Jan. 21-25, 2019, 19 Pages, Jan. 21, 2019.

ASUSTEK: "SCell BFR Regarding Scell Deactivation", 3GPP TSG-RAN WG2 Meeting #109-e, R2-2001600, Feb. 24, 2019-Mar. 6, 2019, Feb. 14, 2020, 4 pages, Part 1.

Qualcomm Incorporated: "Cancellation the Pending BFR SR", 3GPP TSG-RAN WG2 Meeting #109bis-e, R2-2003253, Electronic, Apr. 20, 2020-Apr. 30, 2020, Apr. 10, 2020, 5 pages, Part 1.

SAMSUNG: "Summary of Proposed Corrections (AI 6.16.3)", 3GPP Draft, 3GPP TSG-RAN2 Meeting #109bis Electronic, R2-2003795, Apr. 20, 2020-Apr. 24, 2020, Apr. 17, 2020, 12 pages, Part 1.

\* cited by examiner

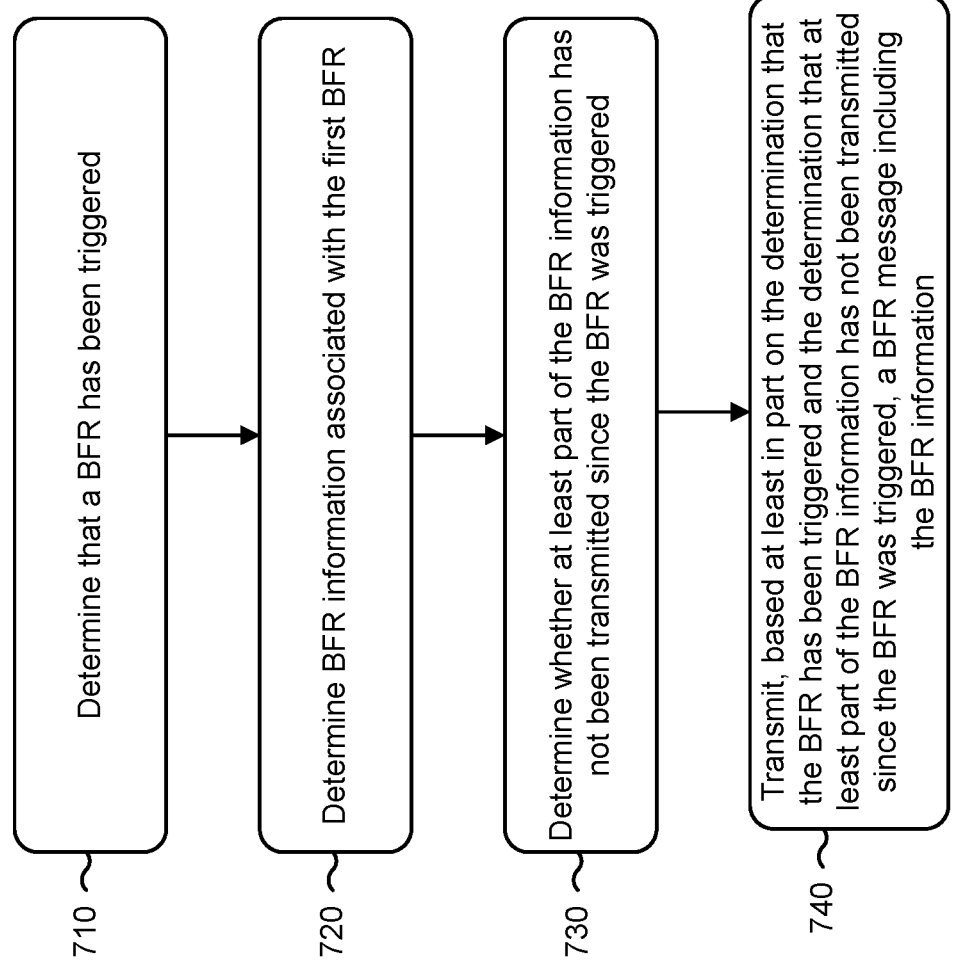

700

710  Determine that a BFR has been triggered

720  Determine BFR information associated with the first BFR

730  Determine whether at least part of the BFR information has not been transmitted since the BFR was triggered 740  Transmit, based at least in part on the determination that the BFR has been triggered and the determination that at least part of the BFR information has not been transmitted since the BFR was triggered, a BFR message including the BFR information

FIG. 7

910 Receive a BFR message from a UE based at least in part on a BFR being triggered at the UE, wherein the BFR message includes BFR information based at least in part on a determination that at least part of the BFR information has not been transmitted since the BFR was triggered at the UE 920 Perform a BFR operation based at least in part on the BFR message

900

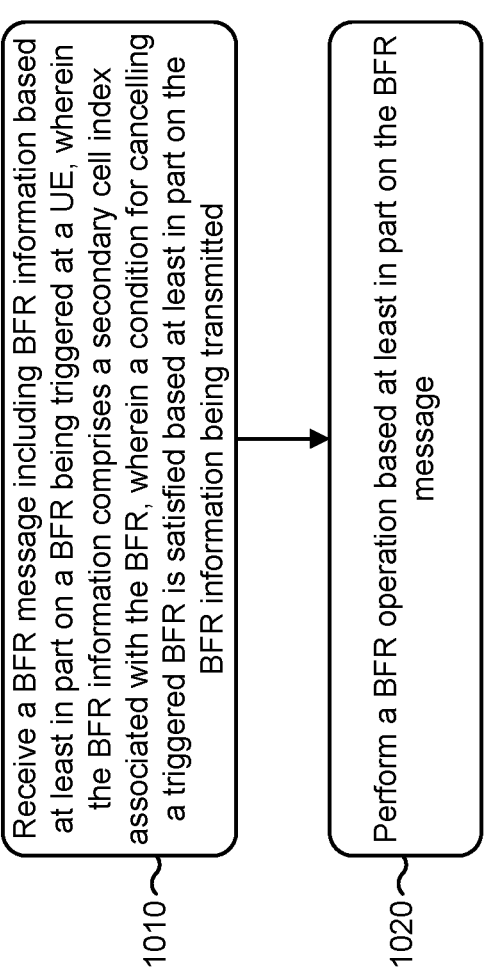

1010 — Receive a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted 1020 — Perform a BFR operation based at least in part on the BFR message

TECHNIQUES FOR MITIGATING REDUNDANT BEAM FAILURE RECOVERY MEDIUM ACCESS SIGNALING

CROSS-REFERENCE TO RELATED APPLICATION

This application is a 371 national stage of PCT Application No. PCT/CN2020/100050 filed on Jul. 3, 2020, entitled "TECHNIQUES FOR MITIGATING REDUNDANT BEAM FAILURE RECOVERY MEDIUM ACCESS SIGNALING," which is hereby expressly incorporated by reference herein.

FIELD OF THE DISCLOSURE

Aspects of the present disclosure generally relate to wireless communication and to techniques and apparatuses for mitigating redundant beam failure recovery (BFR) medium access signaling.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining that a beam failure recovery (BFR) has been triggered; determining BFR information associated with the BFR; determining whether at least part of the BFR information has not been transmitted since the BFR was triggered; and transmitting, based at least in part on the determination that the BFR has been triggered and the determination that at least part of the BFR information has not been transmitted since the BFR was triggered, a BFR message including the BFR information.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the transmission of the BFR message including the BFR information is further based at least in part on determining that the BFR has been triggered and not cancelled.

In some aspects, the BFR has been triggered for one or more secondary cells of the UE.

In some aspects, the BFR information includes a candidate beam availability indication for one or more secondary cells indicated in a bitmap of the BFR message.

In some aspects, the at least part of the BFR information comprises a secondary cell index associated with the BFR.

In some aspects, the secondary cell index is included in a bitmap of the BFR message.

In some aspects, the BFR information is provided in a first octet of a medium access control control element of the BFR message.

In some aspects, the method includes determining, based at least in part on transmitting the BFR message, that the at least part of the BFR information has been transmitted based at least in part on the secondary cell index being included in the BFR message.

In some aspects, the BFR information is defined as a secondary cell index associated with the BFR.

In some aspects, the secondary cell index is included in a bitmap of the BFR message.

In some aspects, a method of wireless communication performed by a UE includes: determining that a BFR has been triggered; and transmitting a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted.

In some aspects, the secondary cell index is included in a bitmap of the BFR message.

3

In some aspects, the BFR information is provided in a first octet of a medium access control control element of the BFR message.

In some aspects, the method includes cancelling the triggered BFR based at least in part on the transmission of the BFR message including the BFR information.

In some aspects, the BFR information is defined as the secondary cell index associated with the BFR.

In some aspects, a method of wireless communication performed by a base station includes: receiving a BFR message from a UE based at least in part on a BFR being triggered at the UE, wherein the BFR message includes BFR information based at least in part on a determination that at least part of the BFR information has not been transmitted since the BFR was triggered at the UE; and performing a BFR operation based at least in part on the BFR message.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the BFR is associated with one or more secondary cells of the UE.

In some aspects, the BFR information includes a candidate beam availability indication for one or more secondary cells indicated in a bitmap of the BFR message, and the method further comprises: performing a BFR procedure based at least in part on the candidate beam availability indication.

In some aspects, the at least part of the BFR information comprises a secondary cell index associated with the BFR.

In some aspects, the secondary cell index is included in a bitmap of the BFR message.

In some aspects, the BFR information is received in a first octet of a medium access control control element of the BFR message.

In some aspects, the BFR information is defined as a secondary cell index associated with the BFR.

In some aspects, the secondary cell index is included in a bitmap of the BFR message.

In some aspects, a method of wireless communication performed by a base station includes: receiving a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted; and performing a BFR operation based at least in part on the BFR message.

In some aspects, the secondary cell index is included in a bitmap of the BFR

In some aspects, the BFR information is in a first octet of a medium access control control element of the BFR message.

In some aspects, the BFR information is defined as the secondary cell index associated with the BFR.

In some aspects, a UE for wireless communication includes: a memory; and one or more processors operatively coupled to the memory, the memory and the one or more processors configured to: determine that a BFR has been triggered; determine BFR information associated with the BFR; determine whether at least part of the BFR information has not been transmitted since the BFR was triggered; and transmit, based at least in part on the determination that the BFR has been triggered and the determination that at least part of the BFR information has not been transmitted since the BFR was triggered, a BFR message including the BFR information.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the transmission of the BFR message including the BFR information is further based at least in part on determining that the BFR has been triggered and not cancelled.

In some aspects, the BFR has been triggered for one or more secondary cells of the UE.

In some aspects, the BFR information includes a candidate beam availability indication for one or more secondary cells indicated in a bitmap of the BFR message.

In some aspects, the at least part of the BFR information comprises a secondary cell index associated with the BFR.

In some aspects, the secondary cell index is included in a bitmap of the BFR message.

In some aspects, the BFR information is provided in a first octet of a medium access control control element of the BFR message.

In some aspects, the one or more processors are further configured to: determine, based at least in part on transmitting the BFR message, that the at least part of the BFR information has been transmitted based at least in part on the secondary cell index being included in the BFR message.

In some aspects, the BFR information is defined as a secondary cell index associated with the BFR.

In some aspects, the secondary cell index is included in a bitmap of the BFR message.

In some aspects, a UE for wireless communication includes: a memory; and one or more processors operatively coupled to the memory, the memory and the one or more processors configured to: determine that a BFR has been triggered; and transmit a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted.

In some aspects, the secondary cell index is included in a bitmap of the BFR message.

In some aspects, the BFR information is provided in a first octet of a medium access control control element of the BFR message.

In some aspects, the one or more processors are further configured to: cancel the triggered BFR based at least in part on the transmission of the BFR message including the BFR information.

In some aspects, the BFR information is defined as the secondary cell index associated with the BFR.

In some aspects, a base station for wireless communication includes: a memory; and one or more processors operatively coupled to the memory, the memory and the one or more processors configured to: receive a BFR message from a UE based at least in part on a BFR being triggered at the UE, wherein the BFR message includes BFR information based at least in part on a determination that at least part of the BFR information has not been transmitted since the BFR was triggered at the UE; and perform a BFR operation based at least in part on the BFR message.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the BFR is associated with one or more secondary cells of the UE.

In some aspects, the BFR information includes a candidate beam availability indication for one or more secondary cells indicated in a bitmap of the BFR message, and the one or more processors are further configured to: perform a BFR procedure based at least in part on the candidate beam availability indication.

In some aspects, the at least part of the BFR information comprises a secondary cell index associated with the BFR.

In some aspects, the secondary cell index is included in a bitmap of the BFR message.

In some aspects, the BFR information is received in a first octet of a medium access control control element of the BFR message.

In some aspects, the BFR information is defined as a secondary cell index associated with the BFR.

In some aspects, the secondary cell index is included in a bitmap of the BFR message.

In some aspects, a base station for wireless communication includes: a memory; and one or more processors operatively coupled to the memory, the memory and the one or more processors configured to: receive a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted; and perform a BFR operation based at least in part on the BFR message.

In some aspects, the secondary cell index is included in a bitmap of the BFR message.

In some aspects, the BFR information is in a first octet of a medium access control control element of the BFR message.

In some aspects, the BFR information is defined as the secondary cell index associated with the BFR.

In some aspects, a non-transitory computer-readable medium storing one or more instructions for wireless communication includes: one or more instructions that, when executed by one or more processors of a UE, cause the one or more processors to: determine that a BFR has been triggered; determine BFR information associated with the BFR; determine whether at least part of the BFR information has not been transmitted since the BFR was triggered; and transmit, based at least in part on the determination that the BFR has been triggered and the determination that at least part of the BFR information has not been transmitted since the BFR was triggered, a BFR message including the BFR information.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the transmission of the BFR message including the BFR information is further based at least in part on determining that the BFR has been triggered and not cancelled.

In some aspects, the BFR has been triggered for one or more secondary cells of the UE.

In some aspects, the BFR information includes a candidate beam availability indication for one or more secondary cells indicated in a bitmap of the BFR message.

In some aspects, the at least part of the BFR information comprises a secondary cell index associated with the BFR.

In some aspects, the secondary cell index is included in a bitmap of the BFR message.

In some aspects, the BFR information is provided in a first octet of a medium access control control element of the BFR message.

In some aspects, the one or more instructions, when executed by the one or more processors, further cause the one or more processors to: determine, based at least in part on transmitting the BFR message, that the at least part of the BFR information has been transmitted based at least in part on the secondary cell index being included in the BFR message.

In some aspects, the BFR information is defined as a secondary cell index associated with the BFR.

In some aspects, the secondary cell index is included in a bitmap of the BFR message.

In some aspects, a non-transitory computer-readable medium storing one or more instructions for wireless communication includes: one or more instructions that, when executed by one or more processors of a UE, cause the one or more processors to: determine that a BFR has been triggered; and transmit a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted.

In some aspects, the secondary cell index is included in a bitmap of the BFR message.

In some aspects, the BFR information is provided in a first octet of a medium access control control element of the BFR message.

In some aspects, the one or more instructions, when executed by the one or more processors, further cause the one or more processors to: cancel the triggered BFR based at least in part on the transmission of the BFR message including the BFR information.

In some aspects, the BFR information is defined as the secondary cell index associated with the BFR.

In some aspects, a non-transitory computer-readable medium storing one or more instructions for wireless communication includes: one or more instructions that, when executed by one or more processors of a base station, cause the one or more processors to: receive a BFR message from a UE based at least in part on a BFR being triggered at the UE, wherein the BFR message includes BFR information based at least in part on a determination that at least part of the BFR information has not been transmitted since the BFR was triggered at the UE; and perform a BFR operation based at least in part on the BFR message.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the BFR is associated with one or more secondary cells of the UE.

In some aspects, the BFR information includes a candidate beam availability indication for one or more secondary cells indicated in a bitmap of the BFR message, and the one or more instructions, when executed by the one or more processors, cause the one or more processors to: perform a BFR procedure based at least in part on the candidate beam availability indication.

In some aspects, the at least part of the BFR information comprises a secondary cell index associated with the BFR.

In some aspects, the secondary cell index is included in a bitmap of the BFR message.

In some aspects, the BFR information is received in a first octet of a medium access control control element of the BFR message.

In some aspects, the BFR information is defined as a secondary cell index associated with the BFR.

In some aspects, the secondary cell index is included in a bitmap of the BFR message.

In some aspects, a non-transitory computer-readable medium storing one or more instructions for wireless communication includes: one or more instructions that, when executed by one or more processors of a base station, cause the one or more processors to: receive a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted; and perform a BFR operation based at least in part on the BFR message.

In some aspects, the secondary cell index is included in a bitmap of the BFR message.

In some aspects, the BFR information is in a first octet of a medium access control control element of the BFR message.

In some aspects, the BFR information is defined as the secondary cell index associated with the BFR.

In some aspects, an apparatus for wireless communication includes: means for determining that a BFR has been triggered; means for determining BFR information associated with the BFR; means for determining whether at least part of the BFR information has not been transmitted since the BFR was triggered; and means for transmitting, based at least in part on the determination that the BFR has been triggered and the determination that at least part of the BFR information has not been transmitted since the BFR was triggered, a BFR message including the BFR information.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the transmission of the BFR message including the BFR information is further based at least in part on determining that the BFR has been triggered and not cancelled.

In some aspects, the BFR has been triggered for one or more secondary cells of the apparatus.

In some aspects, the BFR information includes a candidate beam availability indication for one or more secondary cells indicated in a bitmap of the BFR message.

In some aspects, the at least part of the BFR information comprises a secondary cell index associated with the BFR.

In some aspects, the secondary cell index is included in a bitmap of the BFR message.

In some aspects, the BFR information is provided in a first octet of a medium access control control element of the BFR message.

In some aspects, the apparatus includes means for determining, based at least in part on transmitting the BFR message, that the at least part of the BFR information has been transmitted based at least in part on the secondary cell index being included in the BFR message.

In some aspects, the BFR information is defined as a secondary cell index associated with the BFR.

In some aspects, the secondary cell index is included in a bitmap of the BFR message.

In some aspects, an apparatus for wireless communication includes: means for determining that a BFR has been triggered; and means for transmitting a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted.

In some aspects, the secondary cell index is included in a bitmap of the BFR message.

In some aspects, the BFR information is provided in a first octet of a medium access control control element of the BFR message.

In some aspects, the apparatus includes means for cancelling the triggered BFR based at least in part on the transmission of the BFR message including the BFR information.

In some aspects, the BFR information is defined as the secondary cell index associated with the BFR.

In some aspects, an apparatus for wireless communication includes: means for receiving a BFR message from a UE based at least in part on a BFR being triggered at the UE, wherein the BFR message includes BFR information based at least in part on a determination that at least part of the BFR information has not been transmitted since the BFR was triggered at the UE; and means for performing a BFR operation based at least in part on the BFR message.

In some aspects, the transmission of the BFR message including the BFR information is further based at least in part on uplink shared channel resources being available for a new transmission and the uplink shared channel resources being capable of accommodating the BFR message and a subheader of the BFR message.

In some aspects, the BFR message comprises a truncated BFR message based at least in part on the uplink shared channel resources being capable of accommodating the truncated BFR message.

In some aspects, the BFR is associated with one or more secondary cells of the UE.

In some aspects, the BFR information includes a candidate beam availability indication for one or more secondary cells indicated in a bitmap of the BFR message, and the apparatus further comprises: means for performing a BFR procedure based at least in part on the candidate beam availability indication.

In some aspects, the at least part of the BFR information comprises a secondary cell index associated with the BFR.

In some aspects, the secondary cell index is included in a bitmap of the BFR message.

In some aspects, the BFR information is received in a first octet of a medium access control control element of the BFR message.

In some aspects, the BFR information is defined as a secondary cell index associated with the BFR.

In some aspects, the secondary cell index is included in a bitmap of the BFR message.

In some aspects, an apparatus for wireless communication includes: means for receiving a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted; and means for performing a BFR operation based at least in part on the BFR message.

In some aspects, the secondary cell index is included in a bitmap of the BFR message.

In some aspects, the BFR information is in a first octet of a medium access control control element of the BFR message.

In some aspects, the BFR information is defined as the secondary cell index associated with the BFR.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes performed, for example, by a UE, in accordance with various aspects of the present disclosure.

FIGS. 9 and 10 are diagrams illustrating example processes performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
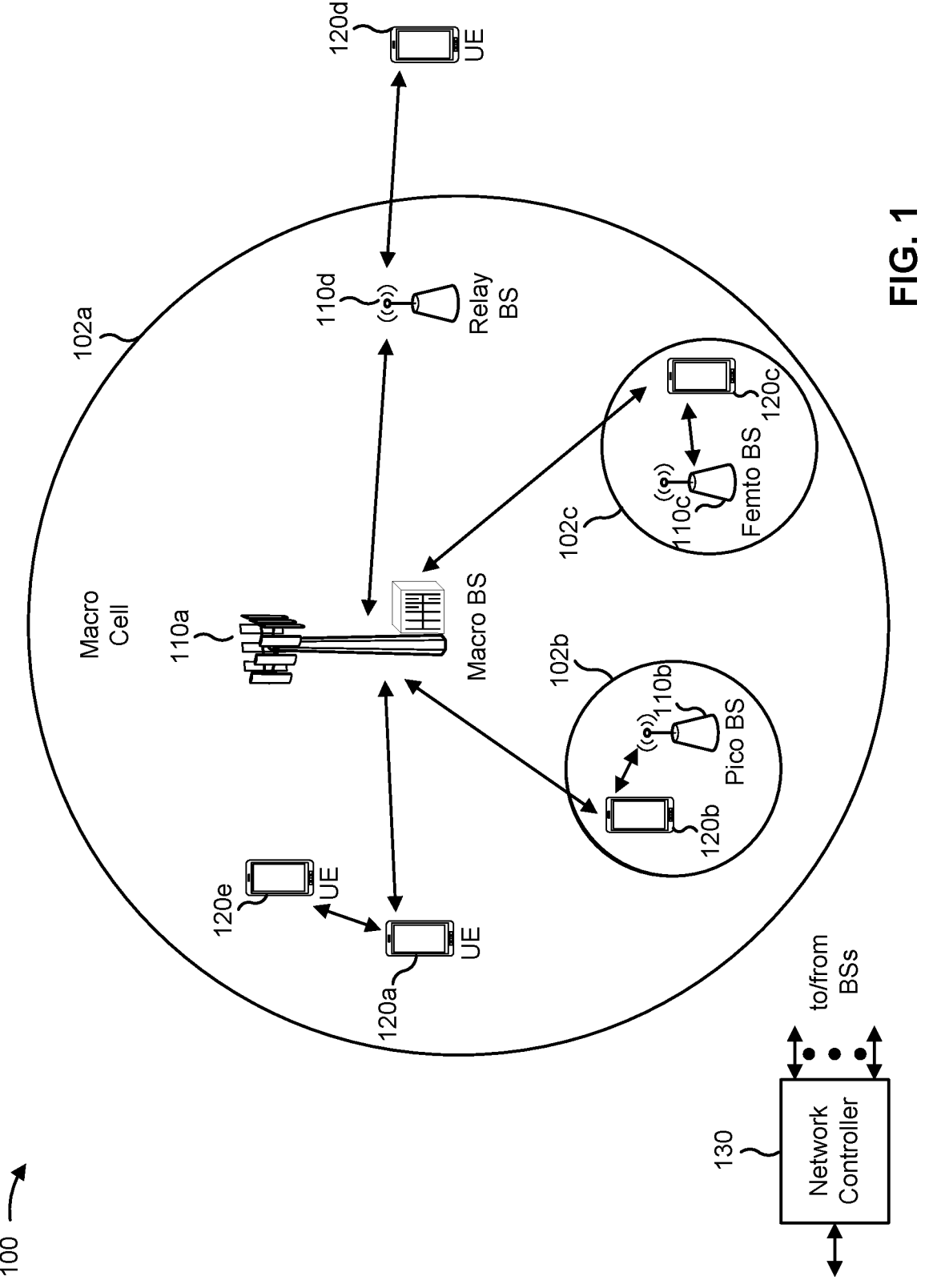
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
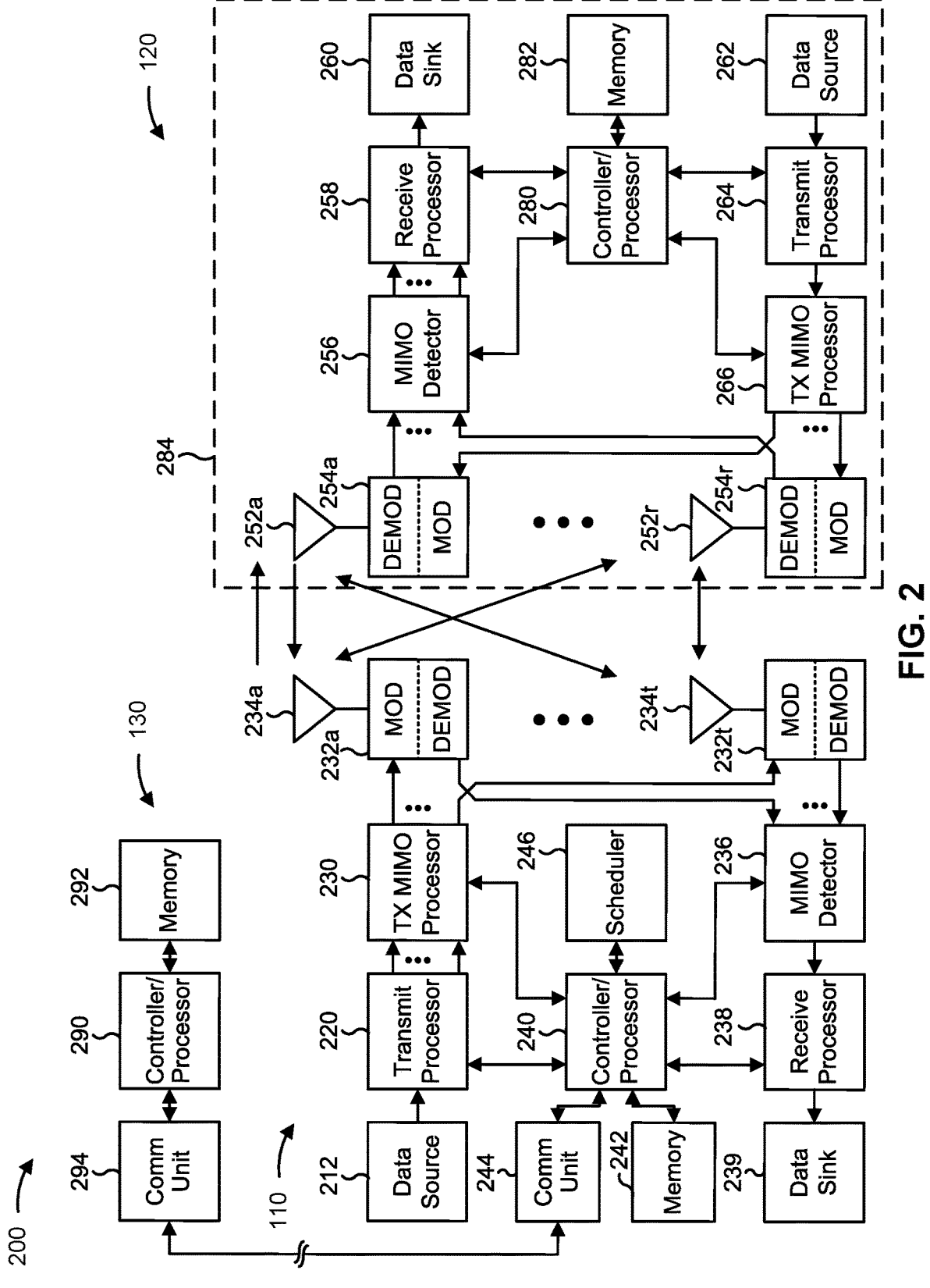
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with mitigating redundant beam failure recovery (BFR) medium access signaling, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, UE 120 may include means for determining that a BFR has been triggered; means for determining BFR information associated with the BFR; means for determining whether at least part of the BFR information has not been transmitted since the BFR was triggered; means for transmitting, based at least in part on the determination that the BFR has been triggered and the determination that at least part of the BFR information has not been transmitted since the BFR was triggered, a BFR message including the BFR information; means for transmitting a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a BFR message from a UE based at least in part on a BFR being triggered at the UE, wherein the BFR message includes BFR information based at least in part on a determination that at least part of the BFR information has not been transmitted since the BFR was triggered at the UE; means for performing a BFR operation based at least in part on the BFR message; means for receiving a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted; means for performing a BFR operation based at least in part on the BFR message; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE and a base station may communicate with each other using beams. A transmitter (e.g., a UE or a base station) may generate a transmit beam by applying a spatial filter to a set of antennas, and a receiver (e.g., a UE or a base station) may generate a corresponding receive beam by applying another spatial filter to a set of antennas. The usage of beams may improve overall network throughput and gain, particularly in higher frequency ranges where omnidirectional or pseudo-omnidirectional transmission may be associated with prohibitive power requirements and radiation levels. A UE and a base station may determine a beam pair for communication between the UE and the base station using a beam selection and refinement procedure.

A UE may monitor reference signals transmitted by a base station to detect beam failure. Beam failure may refer to one or more of a UE-side beam or a BS-side beam failing to provide adequate coverage for communications between a UE and a base station. Beam failure may occur due to changing channel conditions, obstacles, distance from the base station transmitting the beam, interference, and/or the like. When a reference signal of a first set of beams fails to satisfy a threshold (e.g., a Qout threshold and/or the like) on a number of monitoring occasions, the UE may identify a beam failure. Beam failure detection (BFD) at a UE may necessitate the performance of a beam failure recovery (BFR) procedure if the wireless communication device is to continue to communicate using beamforming. In some aspects, a BFR procedure may involve reporting that a beam failure has occurred and/or reporting a candidate beam that the UE can switch to in order to continue beamforming based communication.

In some aspects, a UE may communicate using carrier aggregation (CA). A CA deployment may involve one or more primary cells (PCells) and one or more SCells. A PCell may operate on a primary frequency (e.g., a first frequency). The UE may perform initial connection establishment procedures and/or connection re-establishment procedures on the PCell. An SCell may operate on a secondary frequency (e.g., a second frequency different from the first frequency). An SCell may be configured via the PCell. An SCell may provide additional radio resources for communication with the UE. The PCell(s) and SCell(s) of a UE may be collectively referred to as serving cells of the UE. In some aspects, a PCell or SCell may be referred to as a component carrier (CC). In some aspects, communication on a PCell or SCell may be configured via bandwidth parts (BWPs).

In some aspects, beam failure may occur on an SCell of a UE. For example, the UE may monitor a configured reference signal (RS) quality of an SCell in a BFD procedure. If the UE detects beam failure, the UE may declare beam failure and may therefore send a beam failure recovery request (such as a scheduling request (SR), and sometimes referred to as a BFR message) including a BFR medium access control (MAC) control element (CE) to the base station. The BFR MAC CE can be transmitted in any available uplink shared channel (UL-SCH) resources if the UL-SCH resources can accommodate the BFR MAC CE. The UE may trigger an SR for each SCell BFR which has been triggered. The BFR MAC CE may include an index associated with the failed SCell (referred to herein as an SCell index) and, optionally, information indicating a candidate beam for the BFR procedure.

In some aspects, all BFRs triggered prior to MAC protocol data unit (PDU) assembly for beam failure recovery for a SCell may be cancelled when a MAC PDU is transmitted and the MAC PDU includes a BFR MAC CE or truncated BFR MAC CE which contains beam failure information of that SCell. In other words, once beam failure information for an SCell has been transmitted, all BFRs triggered prior to MAC PDU assembly of the MAC PDU that provides the beam failure information may be cancelled. However, in some aspects, the UE may be mandated to perform logical channel prioritization (LCP) when an uplink grant is received if a BFR MAC CE is to be transmitted. In some aspects, the beam failure information may be defined as one or more octets containing a candidate beam availability indication for an SCell indicated by the BFR MAC CE.

It may take some amount of time for the UE to identify a candidate beam for the BFR, for example due to antenna tuning time and determination of the candidate beam. While determining the candidate beam, the UE may continue to transmit BFR MAC CEs on uplink grants due to the LCP mandate. Since the transmitted BFR MAC CEs do not include the beam failure information, the BFR may not be cancelled, and transmission of the BFR MAC CEs may continue until a candidate beam is determined and signaled to the BS, which consumes significant resources and increases overhead of the UE and the BS associated with repeatedly signaling MAC CEs.

Some techniques and apparatuses described herein provide approaches for reducing redundant transmission of BFR MAC CEs so that the UE can skip transmission of one or more BFR MAC CEs. In some aspects, the UE may transmit a BFR MAC CE based at least in part on whether BFR information to be included in the BFR MAC CE has already been transmitted (e.g., reported) since a most recently triggered BFR. In some aspects, the BFR information that triggers the cancellation of the BFR may be defined as an SCell index associated with the SCell for which BFR is triggered. Thus, the condition for triggering the cancellation of the BFR may be satisfied by a first BFR MAC CE associated with the BFR, thereby eliminating the need to transmit subsequent BFR MAC CEs. In this way, resource consumption and overhead associated with BFR signaling is reduced.

Figure 3:
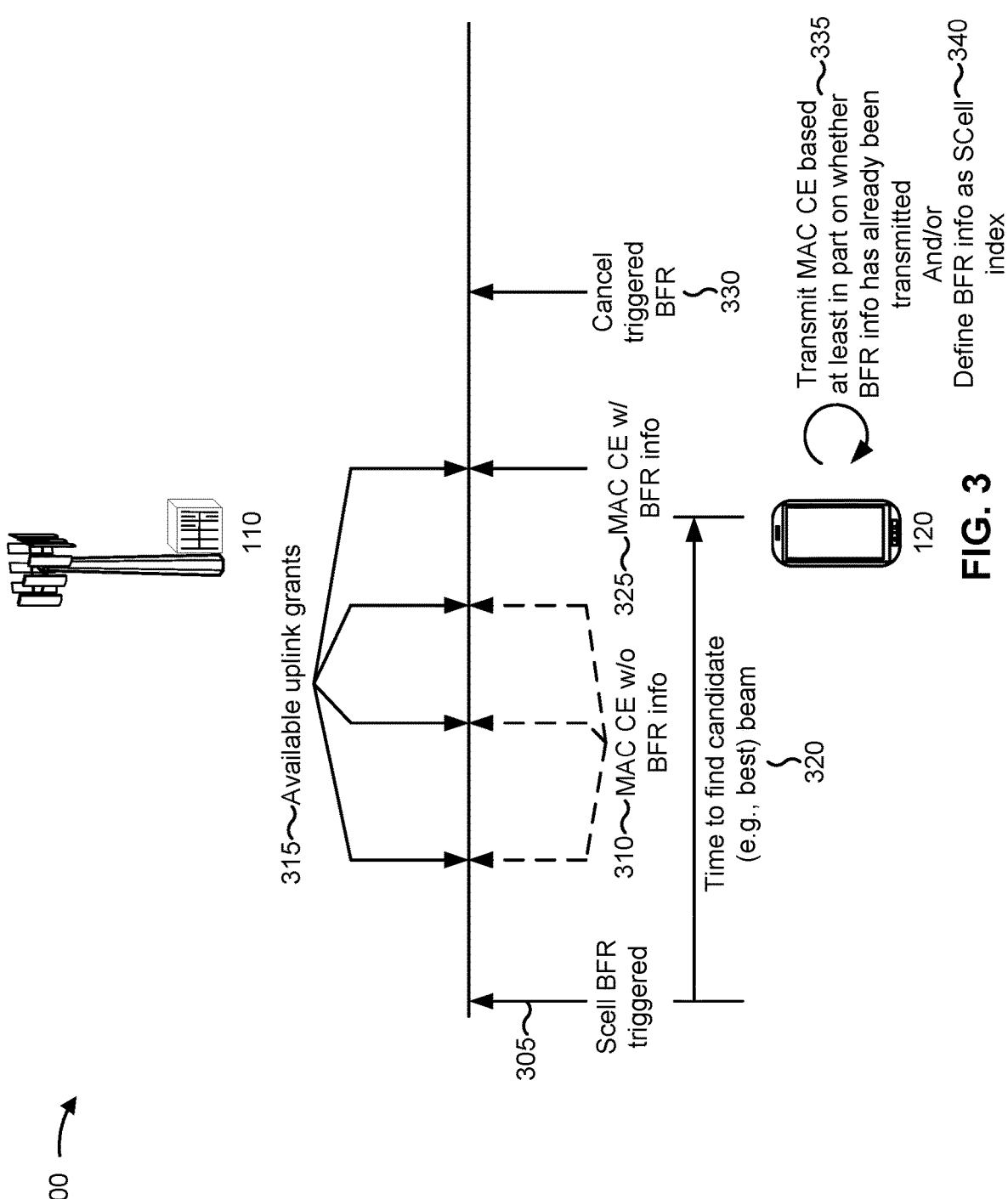
FIG. 3 is a diagram illustrating an example of repetitious transmission of a beam failure recovery (BFR) medium access control (MAC) control element (CE) based at least in part on the mandate to perform logical channel prioritization when an uplink grant is received if a BFR MAC CE is transmitted, in accordance with various aspects of the present disclosure.

FIG. 3 is a diagram illustrating an example 300 of repetitious transmission of a BFR MAC CE. The repetitious transmission of example 300 may occur based at least in part on the mandate to perform LCP when an uplink grant is received if a BFR MAC CE is transmitted, in accordance with various aspects of the present disclosure. As shown, example 300 includes a UE 120 and a BS 110. Actions performed by the UE 120 are indicated by upward arrows (such as the arrow indicated by reference number 305) and actions performed by the BS 110 are indicated by downward arrows (such as the arrows indicated by reference number 315). The UE 120 and the BS 110 of example 300 may be associated with a beamformed communication link involving at least one SCell.

As shown by reference number 305, the UE 120 may determine that a BFR on an SCell of the UE 120 is triggered. For example, the UE 120 may determine that the BFR is triggered based at least in part on a BFD procedure. More particularly, the UE 120 may determine that one or more measurements on the SCell have failed to satisfy a threshold, that a block error rate on the SCell fails to satisfy a threshold, and/or the like.

The UE 120 may transmit one or more BFR MAC CEs 310 based at least in part on the BFR being triggered on the SCell. A BFR MAC CE may indicate the SCell associated with the BFR (e.g., based at least in part on an SCell index of the SCell). In some aspects, the BFR MAC CE may indicate a candidate beam index corresponding to a beam selected by the UE 120, such as a best beam (as determined by the UE 120) for the BFR. For a more detailed description of the content of the BFR MAC CE, refer to FIG. 6.

As shown, the UE 120 may transmit BFR MAC CEs 310 on uplink grants 315. For example, the UE 120 may be mandated to perform LCP for the BFR MAC CEs, so the UE 120 may transmit BFR MAC CEs 310 on each available uplink grant 315. As further shown, the BFR MAC CEs 310 do not include BFR information. In some aspects, BFR information refers to information indicating a best beam. In other aspects, as described with regard to FIG. 5, BFR information refers to an SCell index for which the BFR is triggered. By defining the BFR information to comprise the SCell index, a condition for cancelling the triggered BFR may be satisfied, thereby reducing the number of BFR MAC CEs 310 to be transmitted by the UE 120.

As shown by reference number 320, it may take some amount of time for the UE 120 to identify a candidate beam for the BFR. After determining the candidate beam, the UE 120 may transmit (e.g., report) a BFR MAC CE 325 including BFR information identifying the candidate beam. Therefore, as shown by reference number 330, the UE 120 may cancel the triggered BFR. For example, the UE 120 may cancel all BFRs triggered prior to MAC PDU assembly of the BFR MAC CE 325 based at least in part on the BFR MAC CE 325 comprising a BFR MAC CE or truncated BFR MAC CE which contains beam failure information (also referred to as BFR information) of the SCell associated with the BFR.

If the UE 120 transmits one or more BFR MAC CEs 310 before determining the candidate beam, the UE 120 may use significant signaling resources for redundant transmissions. Some techniques and apparatuses described herein provide approaches for reducing redundant transmission of BFR MAC CEs 310, so that the UE 120 can skip transmission of one or more BFR MAC CEs 310 (hence the BFR MAC CEs 310 being illustrated using dashed lines). For example, in some aspects, as shown by reference number 335, the UE 120 may transmit a BFR MAC CE 310/325 based at least in part on whether BFR information to be included in the BFR MAC CE 310/325 has already been transmitted (e.g., reported) since a most recently triggered BFR 305. Such aspects are described in more detail in connection with FIG. 4. In some aspects, as shown by reference number 340, the BFR information that triggers the cancellation of the BFR may be defined as an SCell index associated with the SCell for which BFR is triggered. Thus, the condition for triggering the cancellation of the BFR may be satisfied by a first BFR MAC CE 310, thereby eliminating the need to transmit subsequent BFR MAC CEs 310 and 325.

As indicated above, FIG. 3 is provided as an example. Other examples may differ from what is described with regard to FIG. 3.

Figure 4:
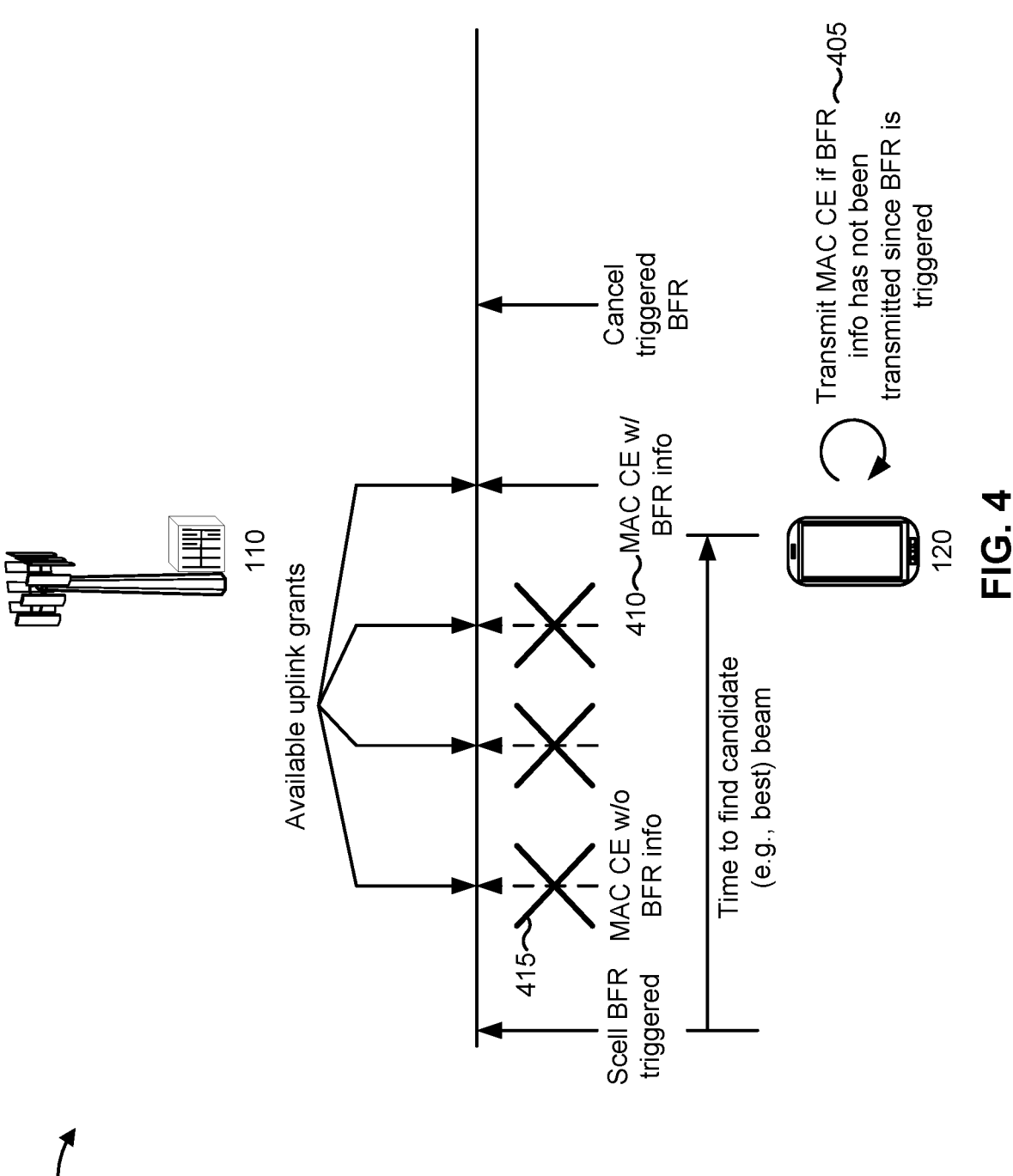
FIG. 4 is a diagram illustrating an example of BFR signaling based at least in part on a condition relating to unreported BFR information, in accordance with various aspects of the present disclosure.

FIG. 4 is a diagram illustrating an example 400 of BFR signaling based at least in part on a condition relating to unreported BFR information, in accordance with various aspects of the present disclosure. As shown, example 400 includes a UE 120 and a BS 110. As in FIG. 3, actions performed by the UE 120 are indicated by upward arrows and actions performed by the BS 110 are indicated by downward arrows. In some aspects, at least one of the operations described as being performed by the UE 120 may be performed by a MAC entity of the UE 120.

In example 400, as shown by reference number 405, the UE 120 may transmit a BFR MAC CE if BFR information to be included in the BFR MAC CE has not been transmitted (e.g., reported) since a most recently triggered BFR. For example, as shown by reference number 410, the UE 120 may transmit the BFR MAC CE with the BFR information after selecting a candidate beam based at least in part on UL-SCH resources (e.g., an uplink grant) being available for a transmission and the UL-SCH resources being capable of accommodating the BFR MAC CE with the BFR information. Thus, the UE 120 may cancel the triggered BFR based at least in part on transmitting the BFR MAC CE including the BFR information. If the BFR information has already been transmitted, or if there is no BFR information to include in the BFR MAC CE, the UE 120 may not transmit the BFR MAC CE, as indicated for example by reference number 415. Thus, the UE 120 may reduce overhead and resource utilization associated with BFR reporting relative to indiscriminately reporting the MAC CE without the BFR information.

In some aspects, the UE 120 may transmit a first BFR MAC CE, and then may transmit a second BFR MAC CE after selecting the candidate beam. For example, the BFR MAC CE may include an indicator of no beam, such as a null beam value. The second BFR MAC CE may include a beam index corresponding to the candidate beam selected by the UE 120.

In some aspects, conditions for transmitting the BFR MAC CE may be defined by an algorithm, such as Algorithm 1 below:

---

*Algorithm 1*

---

1> if the Beam Failure Recovery procedure determines that at least one BFR has been triggered and not cancelled:
2> if UL-SCH resources are available for a new transmission and if the UL-SCH resources can accommodate the BFR MAC CE plus the BFR MAC CE's subheader as a result of LCP; and
2> if UE has new beam failure recovery information that has not been reported since the last BFR is triggered:
   3> instruct the Multiplexing and Assembly procedure to generate the BFR MAC CE.
2> else if UL-SCH resources are available for a new transmission and if the UL-SCH resources can accommodate the Truncated BFR MAC CE plus the Truncated BFR MAC CE's subheader as a result of LCP; and
2> if UE has new beam failure recovery information that has not been reported since the last BFR is triggered:
   3> instruct the Multiplexing and Assembly procedure to generate the Truncated BFR MAC CE.
2> else:
   3> trigger the SR for SCell beam failure recovery for each SCell for which BFR has been triggered and not cancelled.

---

As indicated above, FIG. 4 is provided as an example. Other examples may differ from what is described with regard to FIG. 4.

Figure 5:
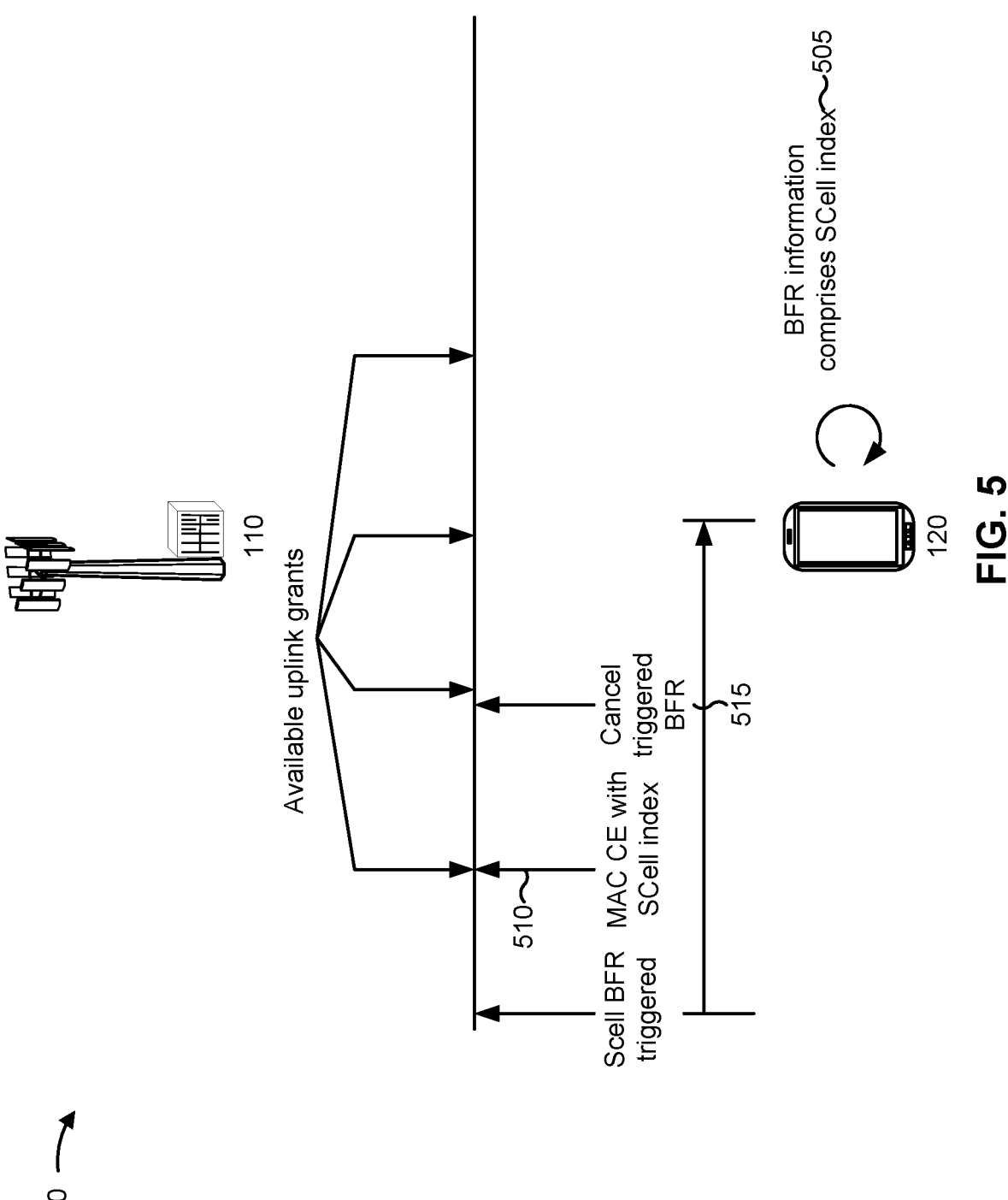
FIG. 5 is a diagram illustrating an example of BFR signaling based at least in part on BFR information comprising an SCell index, in accordance with various aspects of the present disclosure.

FIG. 5 is a diagram illustrating an example 500 of BFR signaling based at least in part on BFR information comprising an SCell index, in accordance with various aspects of the present disclosure. As shown, example 500 includes a UE 120 and a BS 110. As in FIGS. 3 and 4, actions performed by the UE 120 are indicated by upward arrows and actions performed by the BS 110 are indicated by downward arrows. In some aspects, at least one of the operations described as being performed by the UE 120 may be performed by a MAC entity of the UE 120.

In example 500, as shown by reference number 505, "BFR information" (sometimes referred to as "beam failure information") may comprise an SCell index. For example, "BFR information" may be defined as a value in a bit field indicating an SCell associated with a BFR (e.g., $C_i$ in example 600 of FIG. 6). Thus, a BFR MAC CE 510 that indicates an SCell index associated with a BFR may satisfy a condition for cancelling a BFR, as shown by reference number 515. Thus, the UE 120 may conserve signaling resources that would otherwise be used to repeatedly transmit the MAC CE with the SCell index and without a candidate beam availability indication for an SCell. In some aspects (not shown in FIG. 5), the UE 120 may signal information indicating a candidate beam for the SCell to the BS 110, such as using a MAC CE on an uplink grant and/or the like.

In some aspects, the operations described with regard to FIG. 4 and FIG. 5 may be combined. For example, the UE 120 transmit the BFR MAC CE if BFR information to be transmitted in the BFR MAC CE has not already been transmitted, and the BFR information may include the SCell index or the field indicating the SCell index.

As indicated above, FIG. 5 is provided as an example. Other examples may differ from what is described with regard to FIG. 5.

Figure 6:
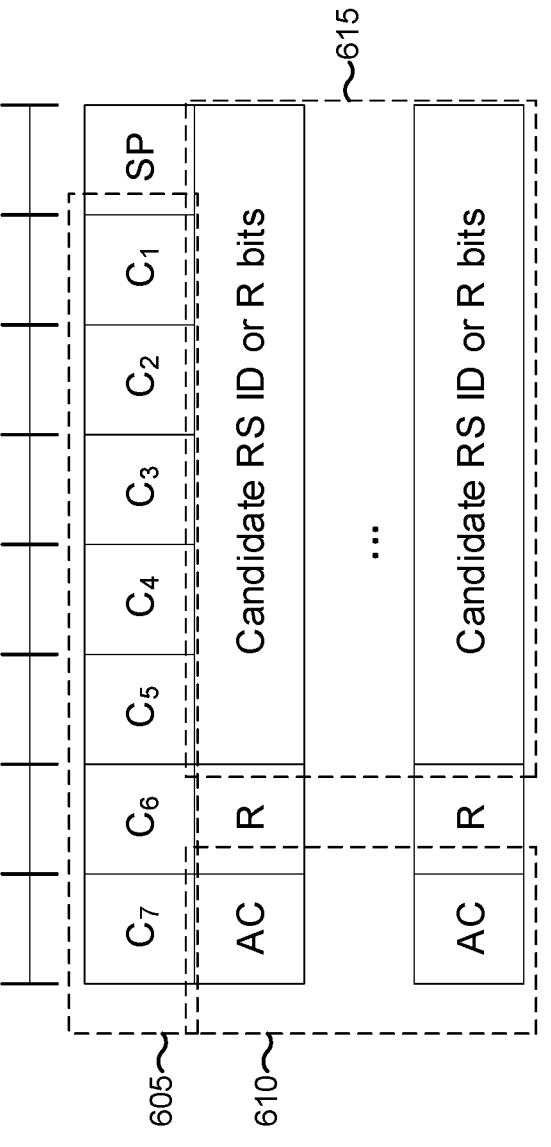
FIG. 6 is a diagram illustrating an example structure of a BFR MAC CE, in accordance with various aspects of the present disclosure.

FIG. 6 is a diagram illustrating an example structure 600 of a BFR MAC CE, in accordance with various aspects of the present disclosure. As shown, the structure 600 includes a bitmap 605, a set of candidate beam availability indication (AC) fields 610, and a set of candidate reference signal (RS) ID fields 615 corresponding to the set of AC fields 610. A $C_i$ field of the bitmap 605 set to a first value (e.g., 1) may indicate a beam failure detection and the presence of an octet containing an AC field 610 for the SCell with serving cell index (e.g., ServCellIndex) i. The $C_i$ field set to a second value (e.g., 0) indicates that the beam failure is not detected and octet containing the AC field 610 is not present for the SCell with ServCellIndex i. The octets containing the AC field 610 may be present in ascending order based on the ServCellIndex. In some aspects, BFR information for the BFR MAC CE may include or may be defined as Ci, as described in more detail in connection with FIG. 5.

The AC field 610 may indicate the presence of a candidate reference signal (RS) ID field 615 in an octet. If at least one synchronization signal block (SSB) with a synchronization signal reference signal received power (SS-RSRP) that satisfies rsrp-ThresholdBFR amongst the SSBs in candidate-BeamRSSCellList or at least one channel state information reference signal (CSI-RS) with a channel state information RSRP (CSI-RSRP) that satisfies rsrp-ThresholdBFR amongst the CSI-RSs in candidateBeamRSSCellList is available, then the AC field 610 may be set to a first value. Otherwise, the AC field 610 may be set to a second value. If the AC field 610 is set to the first value, the candidate RS ID field 615 is present. If the AC field 610 is set to the second value, one or more reserved bits are present. In some aspects, such as described in connection with FIG. 4, the BFR information for the BFR MAC CE may include or be defined as the AC field 610 and/or the candidate RS ID field 615.

As indicated above, FIG. 6 is provided as an example. Other examples may differ from what is described with regard to FIG. 6.

FIG. 7 is a diagram illustrating an example process 700 performed, for example, by a UE, in accordance with various aspects of the present disclosure. Example process 700 is an example where the UE (e.g., UE 120 and/or the like) performs operations associated with techniques for mitigating redundant beam failure recovery medium access signaling. In some aspects, one or more of the operations described with regard to example 700 may be performed by one or more of the components of FIG. 11, such as transmission component 1104, reception component 1102, BFD/BFR component 1108, determination component 1110, and/or the like.

As shown in FIG. 7, in some aspects, process 700 may include determining that a BFR has been triggered (block 710). For example, the UE (e.g., using antenna 252, DEMOD 254, MIMO detector 256, receive processor 258, controller/processor 280, and/or the like) may determine that a BFR has been triggered, as described above. In some aspects, the operation indicated by block 710 may be performed by reception component 1102 or BFD/BFR component 1108.

As further shown in FIG. 7, in some aspects, process 700 may include determining BFR information associated with the BFR (block 720). For example, the UE (e.g., using antenna 252, DEMOD 254, MIMO detector 256, receive processor 258, controller/processor 280, and/or the like) may determine BFR information associated with the BFR, as described above. In some aspects, the operation indicated by block 720 may be performed by reception component 1102 or BFD/BFR component 1108. In some aspects, the UE may determine the BFR information after transmitting one or more BFR messages.

As further shown in FIG. 7, in some aspects, process 700 may include determining whether at least part of the BFR information has not been transmitted since the BFR was triggered (block 730). For example, the UE (e.g., using antenna 252, DEMOD 254, MIMO detector 256, receive processor 258, controller/processor 280, and/or the like) may determine whether at least part of the BFR information has not been transmitted since the BFR was triggered, as described above. In some aspects, the operation indicated by block 730 may be performed by transmission component 1104, BFD/BFR component 1108, or determination component 1110.

As further shown in FIG. 7, in some aspects, process 700 may include transmitting, based at least in part on the determination that the BFR has been triggered and the determination that at least part of the BFR information has not been transmitted since the BFR was triggered, a BFR message including the BFR information (block 740). For example, the UE (e.g., using controller/processor 280, transmit processor 264, TX MIMO processor 266, MOD 254, antenna 252, and/or the like) may transmit, based at least in part on the determination that the BFR has been triggered and the determination that at least part of the BFR information has not been transmitted since the BFR was triggered, a BFR message including the BFR information, as described above. In some aspects, the operation indicated by block 740 may be performed by transmission component 1102 or BFD/BFR component 1108.

Process 700 may include additional aspects, such as any single aspect or any combination of aspects described below and/or in connection with one or more other processes described elsewhere herein.

In a first aspect, the transmission of the BFR message including the BFR information is further based at least in part on uplink shared channel resources being available for a new transmission and the uplink shared channel resources being capable of accommodating the BFR message and a subheader of the BFR message.

In a second aspect, alone or in combination with the first aspect, the BFR message comprises a truncated BFR message based at least in part on the uplink shared channel resources being capable of accommodating the truncated BFR message.

In a third aspect, alone or in combination with one or more of the first and second aspects, the transmission of the BFR message including the BFR information is further based at least in part on determining that the BFR has been triggered and not cancelled.

In a fourth aspect, alone or in combination with one or more of the first through third aspects, the BFR has been triggered for one or more secondary cells of the UE.

In a fifth aspect, alone or in combination with one or more of the first through fourth aspects, the BFR information includes a candidate beam availability indication for one or more secondary cells indicated in a bitmap of the BFR message.

In a sixth aspect, alone or in combination with one or more of the first through fifth aspects, the at least part of the BFR information comprises a secondary cell index associated with the BFR.

In a seventh aspect, alone or in combination with one or more of the first through sixth aspects, the secondary cell index is included in a bitmap of the BFR message.

In an eighth aspect, alone or in combination with one or more of the first through seventh aspects, the BFR information is provided in a first octet of a medium access control control element of the BFR message.

In a ninth aspect, alone or in combination with one or more of the first through eighth aspects, process 700 includes determining, based at least in part on transmitting the BFR message, that the at least part of the BFR information has been transmitted based at least in part on the secondary cell index being included in the BFR message. In some aspects, the operation of the ninth aspect may be performed by BFD/BFR component 1108 or determination component 1110.

In a tenth aspect, alone or in combination with one or more of the first through ninth aspects, the BFR information is defined as a secondary cell index associated with the BFR.

In an eleventh aspect, alone or in combination with one or more of the first through tenth aspects, the secondary cell index is included in a bitmap of the BFR message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
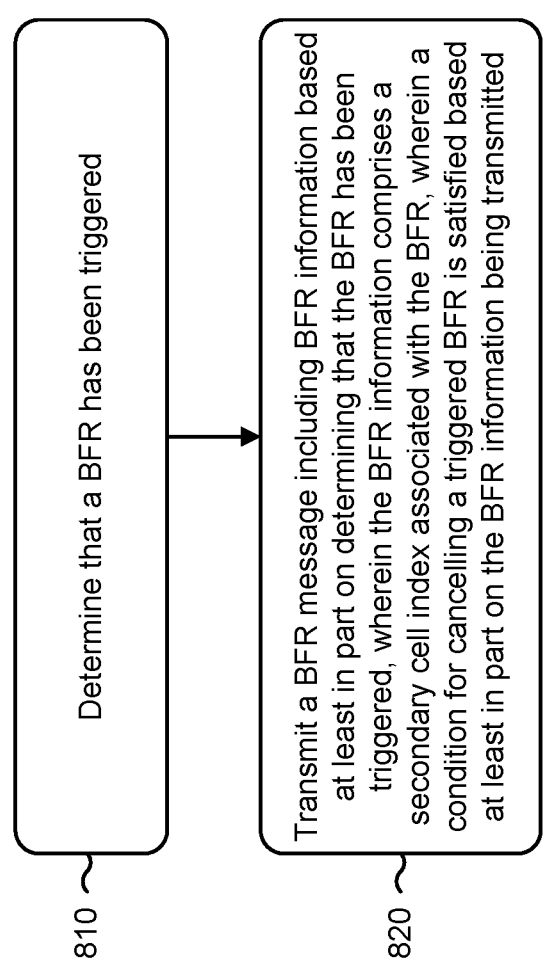

FIG. 8 is a diagram illustrating an example process 800 performed, for example, by a UE, in accordance with various aspects of the present disclosure. Example process 800 is an example where the UE (e.g., UE 120 and/or the like) performs operations associated with techniques for mitigating redundant beam failure recovery medium access signaling. In some aspects, one or more of the operations described with regard to example 800 may be performed by one or more of the components of FIG. 11, such as transmission component 1104, reception component 1102, BFD/BFR component 1108, determination component 1110, and/or the like.

As shown in FIG. 8, in some aspects, process 800 may include determining that a BFR has been triggered (block 810). For example, the UE (e.g., using antenna 252, DEMOD 254, MIMO detector 256, receive processor 258, controller/processor 280, and/or the like) may determine that a beam failure recovery (BFR) has been triggered, as described above. In some aspects, the operation indicated by block 810 may be performed by reception component 1102 or BFD/BFR component 1108.

As further shown in FIG. 8, in some aspects, process 800 may include transmitting a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted (block 820). For example, the UE (e.g., using controller/processor 280, transmit processor 264, TX MIMO processor 266, MOD 254, antenna 252, and/or the like) may transmit a BFR message including BFR information based at least in part on determining that the BFR has been triggered, as described above. In some aspects, the BFR information comprises a secondary cell index associated with the BFR. In some aspects, a condition for cancelling a triggered BFR is satisfied based at least in part on the BFR information being transmitted. In some aspects, the operation indicated by block 820 may be performed by transmission component 1104 or BFD/BFR component 1108.

Process 800 may include additional aspects, such as any single aspect or any combination of aspects described below and/or in connection with one or more other processes described elsewhere herein.

In a first aspect, the secondary cell index is included in a bitmap of the BFR message.

In a second aspect, alone or in combination with the first aspect, the BFR information is provided in a first octet of a medium access control control element of the BFR message.

In a third aspect, alone or in combination with one or more of the first and second aspects, process 800 includes cancelling the triggered BFR based at least in part on the transmission of the BFR message including the BFR information. In some aspects, the operation of the third aspect may be performed by transmission component 1104 or BFD/BFR component 1108.

In a fourth aspect, alone or in combination with one or more of the first through third aspects, the BFR information is defined as the secondary cell index associated with the BFR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
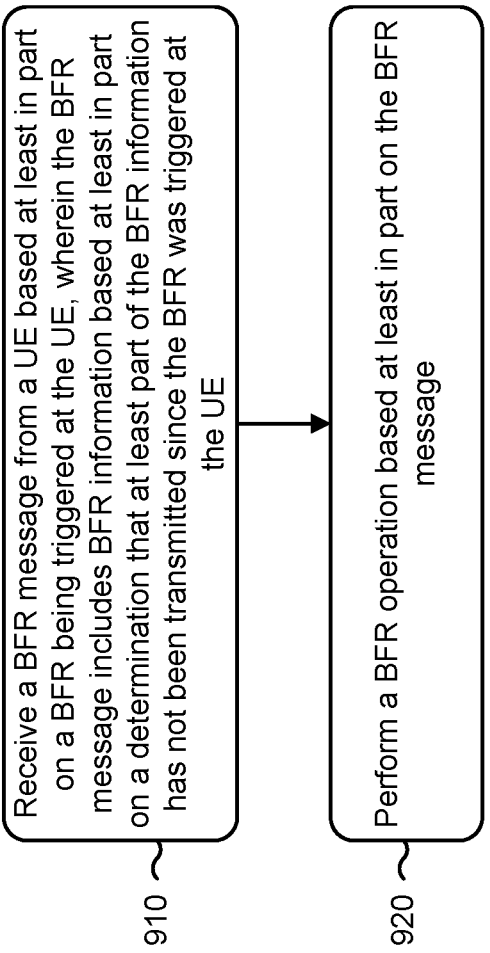

FIG. 9 is a diagram illustrating an example process 900 performed, for example, by a base station, in accordance with various aspects of the present disclosure. Example process 900 is an example where the base station (e.g., BS 110 and/or the like) performs operations associated with techniques for mitigating redundant beam failure recovery medium access signaling. In some aspects, one or more of the operations described with regard to example 900 may be performed by one or more of the components of FIG. 12, such as transmission component 1204, reception component 1202, BFR component 1208, and/or the like.

As shown in FIG. 9, in some aspects, process 900 may include receiving a BFR message from a UE based at least in part on a BFR being triggered at the UE, wherein the BFR message includes BFR information based at least in part on a determination that at least part of the BFR information has not been transmitted since the BFR was triggered at the UE (block 910). For example, the base station (e.g., using antenna 234, DEMOD 232, MIMO detector 236, receive processor 238, controller/processor 240, and/or the like) may receive a BFR message from a UE based at least in part on a BFR being triggered at the UE, as described above. In some aspects, the BFR message includes BFR information based at least in part on a determination that at least part of the BFR information has not been transmitted since the BFR was triggered at the UE. In some aspects, the operation of block 910 may be performed by reception component 1202 or BFR component 1208.

As further shown in FIG. 9, in some aspects, process 900 may include performing a BFR operation based at least in part on the BFR message (block 920). For example, the base station (e.g., using controller/processor 240, transmit processor 220, TX MIMO processor 230, MOD 232, antenna 234, and/or the like) may perform a BFR operation based at least in part on the BFR message, as described above. In some aspects, the operation of block 920 may be performed by transmission component 1204 or BFR component 1208.

Process 900 may include additional aspects, such as any single aspect or any combination of aspects described below and/or in connection with one or more other processes described elsewhere herein.

In a first aspect, the transmission of the BFR message including the BFR information is further based at least in part on uplink shared channel resources being available for a new transmission and the uplink shared channel resources being capable of accommodating the BFR message and a subheader of the BFR message.

In a second aspect, alone or in combination with the first aspect, the BFR message comprises a truncated BFR message based at least in part on the uplink shared channel resources being capable of accommodating the truncated BFR message.

In a third aspect, alone or in combination with one or more of the first and second aspects, the BFR is associated with one or more secondary cells of the UE.

In a fourth aspect, alone or in combination with one or more of the first through third aspects, process 900 includes performing a BFR procedure based at least in part on the candidate beam availability indication. In some aspects, the operation of the fourth aspect may be performed by BFR component 1208.

In a fifth aspect, alone or in combination with one or more of the first through fourth aspects, the at least part of the BFR information comprises a secondary cell index associated with the BFR.

In a sixth aspect, alone or in combination with one or more of the first through fifth aspects, the secondary cell index is included in a bitmap of the BFR message.

In a seventh aspect, alone or in combination with one or more of the first through sixth aspects, the BFR information is received in a first octet of a medium access control control element of the BFR message.

In an eighth aspect, alone or in combination with one or more of the first through seventh aspects, the BFR information is defined as a secondary cell index associated with the BFR.

In a ninth aspect, alone or in combination with one or more of the first through eighth aspects, the secondary cell index is included in a bitmap of the BFR message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with techniques for mitigating redundant beam failure recovery medium access signaling. In some aspects, one or more of the operations described with regard to example 1000 may be performed by one or more of the components of FIG. 12, such as transmission component 1204, reception component 1202, BFR component 1208, and/or the like.

As shown in FIG. 10, in some aspects, process 1000 may include receiving a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted (block 1010). For example, the base station (e.g., using antenna 234, DEMOD 232, MIMO detector 236, receive processor 238, controller/processor 240, and/or the like) may receive a BFR message including BFR information based at least in part on a BFR being triggered at a UE, as described above. In some aspects, the BFR information comprises a secondary cell index associated with the BFR. In some aspects, a condition for cancelling a triggered BFR is satisfied based at least in part on the BFR information being transmitted. In some aspects, the operation of block 1010 may be performed by reception component 1202 or BFR component 1208.

As further shown in FIG. 10, in some aspects, process 1000 may include performing a BFR operation based at least in part on the BFR message (block 1020). For example, the base station (e.g., using controller/processor 240, transmit processor 220, TX MIMO processor 230, MOD 232, antenna 234, and/or the like) may perform a BFR operation based at least in part on the BFR message, as described above. In some aspects, the operation of block 1010 may be performed by transmission component 1204, reception component 1202, or BFR component 1208.

Process 1000 may include additional aspects, such as any single aspect or any combination of aspects described below and/or in connection with one or more other processes described elsewhere herein.

In a first aspect, the secondary cell index is included in a bitmap of the BFR message.

In a second aspect, alone or in combination with the first aspect, the BFR information is in a first octet of a medium access control control element of the BFR message.

In a third aspect, alone or in combination with one or more of the first and second aspects, the BFR information is defined as the secondary cell index associated with the BFR.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
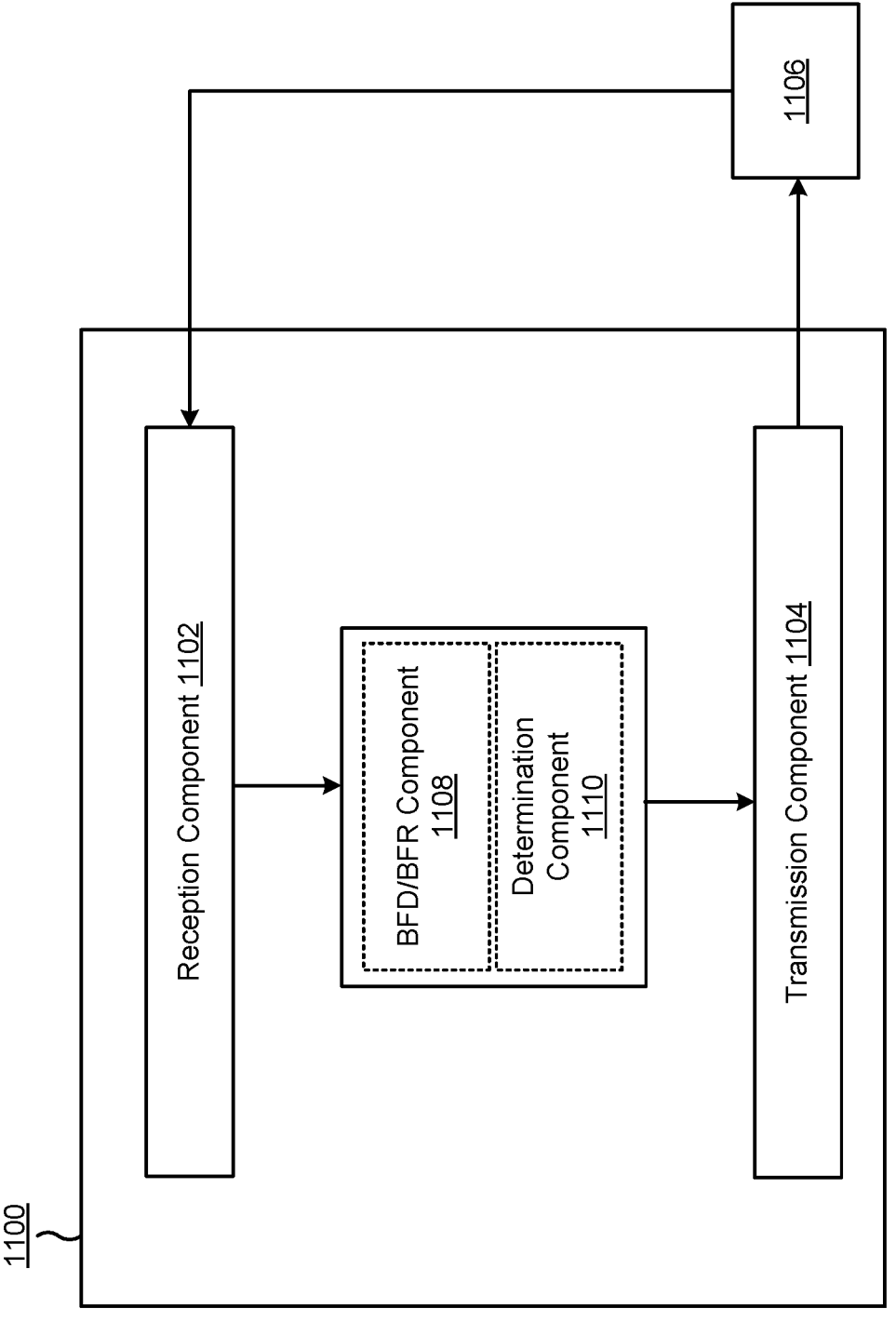
FIGS. 11 and 12 are block diagrams of example apparatuses for wireless communication.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a BFD/BFR component 1108 or a determination component 1110, among other examples.

In some aspects, the apparatus 1100 may be configured to perform one or more operations described herein in connection with FIGS. 3-6. Additionally or alternatively, the apparatus 1100 may be configured to perform one or more processes described herein, such as process 700 of FIG. 7, process 800 of FIG. 8, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals (e.g., associated with a BFD/BFR procedure), control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information (e.g., a BFR MAC CE), data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The BFD/BFR component 1108 may determine that a BFR has been triggered, for example, based at least in part on a BFD procedure. The BFD/BFR component 1108 may determine BFR information associated with the BFR. The determination component 1110 may determine whether at least part of the BFR information has not been transmitted since the BFR was triggered. The BFD/BFR component 1108 or the transmission component 1104 may transmit, based at least in part on the determination that the BFR has been triggered and the determination that at least part of the BFR information has not been transmitted since the BFR was triggered, a BFR message including the BFR information.

In some aspects, the BFD/BFR component 1108 may determine that a beam BFR has been triggered. The transmission component 1104 or the BFD/BFR component 1108 may transmit a BFR message including BFR information based at least in part on determining that the BFR has been triggered, wherein the BFR information comprises a secondary cell index associated with the BFR, wherein a condition for cancelling a triggered BFR is satisfied based at least in part on the BFR information being transmitted.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
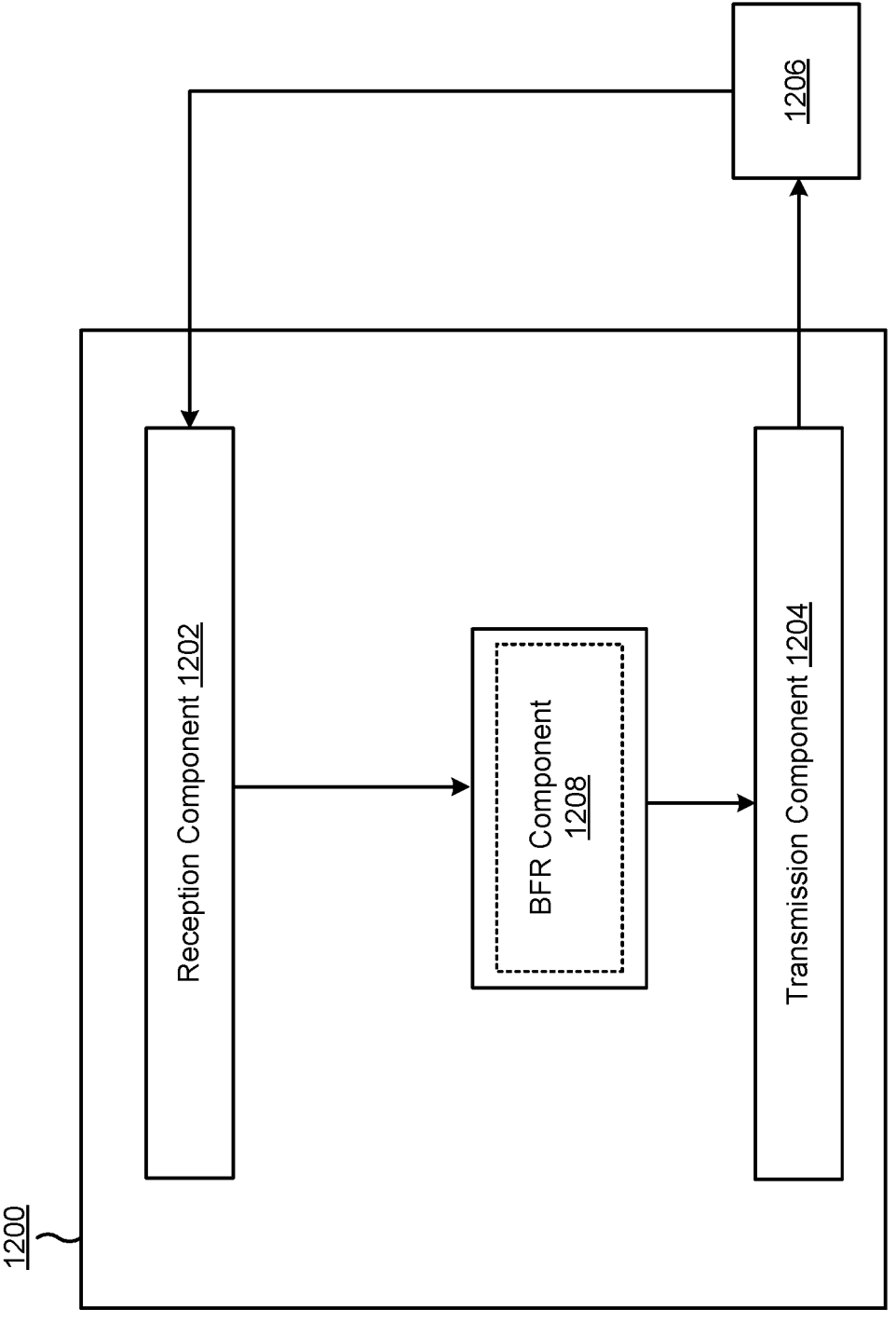

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a BFR component 1208.

In some aspects, the apparatus 1200 may be configured to perform one or more operations described herein in connection with FIGS. 3-6. Additionally or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

In some aspects, the reception component 1202 or the BFR component 1208 may receive a BFR message from a UE based at least in part on a BFR being triggered at the UE, wherein the BFR message includes BFR information based at least in part on a determination that at least part of the BFR information has not been transmitted since the BFR was triggered at the UE. The BFR component 1208 may perform a BFR operation based at least in part on the BFR message.

In some aspects, the reception component 1202 or the BFR component 1208 may receive a BFR message including BFR information based at least in part on a BFR being triggered at a UE, wherein the BFR information comprises a secondary cell index associated with the BFR, wherein a condition for cancelling a triggered BFR is satisfied based at least in part on the BFR information being transmitted. The BFR component 1208 may perform a BFR operation based at least in part on the BFR message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining that a beam failure recovery (BFR) has been triggered;
   determining, for a length of time corresponding to an evaluation period for identifying one or more candidate beams associated with the BFR and following detection of a beam failure associated with the BFR, BFR information associated with the BFR, wherein the length of time spans at least one opportunity for BFR message transmission during which uplink shared channel resources are available for transmission, and during the length of time, the UE skips transmission of a BFR message in response to at least one of: the BFR information having not changed relative to the BFR information most recently transmitted for a current beam failure recovery event, or the BFR information not yet being evaluated or determined based on the evaluation period; and
   transmitting, after completion of the evaluation period and after determining the BFR information, the BFR message including the BFR information.

2. The method of claim 1, wherein the transmission of the BFR message including the BFR information is further based at least in part on the uplink shared channel resources available for a new transmission having a size at least equal to a combined size of the BFR message and a subheader of the BFR message.

3. The method of claim 2, wherein the BFR message comprises a truncated BFR message.

4. The method of claim 1, wherein the transmission of the BFR message including the BFR information is further based at least in part on determining that the BFR has been triggered and not cancelled.

5. The method of claim 1, wherein the BFR is for one or more secondary cells of the UE.

6. The method of claim 1, wherein the BFR information includes a candidate beam availability indication for one or more secondary cells indicated in a bitmap of the BFR message.

7. The method of claim 1, wherein at least part of the BFR information comprises a secondary cell index associated with the BFR.

8. The method of claim 7, wherein the secondary cell index is included in a bitmap of the BFR message.

9. The method of claim 7, wherein the BFR information is in a first octet of a medium access control control element of the BFR message.

10. The method of claim 7, further comprising:
    determining, based at least in part on transmitting the BFR message, that the at least part of the BFR information has been transmitted based at least in part on the secondary cell index being included in the BFR message.

11. The method of claim 1, wherein the BFR information is defined as a secondary cell index associated with the BFR.

12. The method of claim 11, wherein the secondary cell index is included in a bitmap of the BFR message.

13. A user equipment (UE) for wireless communication, comprising:
    one or more memories; and
    one or more processors coupled to the one or more memories, the one or more processors configured to:

determine that a beam failure recovery (BFR) has been triggered;

determine, for a length of time corresponding to an evaluation period for identifying one or more candidate beams associated with the BFR and following detection of a beam failure associated with the BFR, BFR information associated with the BFR, wherein the length of time spans at least one opportunity for BFR message transmission during which uplink shared channel resources are available for transmission, and during the length of time, the UE skips transmission of a BFR message in response to at least one of: the BFR information having not changed relative to the BFR information most recently transmitted for a current beam failure recovery event, or the BFR information not yet being evaluated or determined based on the evaluation period; and transmit, after completion of the evaluation period and after determining the BFR information, the BFR message including the BFR information.

14. The UE of claim 13, wherein the transmission of the BFR message including the BFR information is further based at least in part on the uplink shared channel resources available for a new transmission having a size at least equal to a combined size of the BFR message and a subheader of the BFR message.

15. The UE of claim 14, wherein the BFR message comprises a truncated BFR message.

16. The UE of claim 13, wherein the transmission of the BFR message including the BFR information is further based at least in part on the BFR being triggered and not cancelled.

17. The UE of claim 13, wherein the BFR is for one or more secondary cells of the UE.

18. The UE of claim 13, wherein the BFR information includes a candidate beam availability indication for one or more secondary cells indicated in a bitmap of the BFR message.

19. The UE of claim 13, wherein at least part of the BFR information comprises a secondary cell index associated with the BFR.

20. The UE of claim 19, wherein the secondary cell index is included in a bitmap of the BFR message.

21. The UE of claim 19, wherein the BFR information is provided in a first octet of a medium access control control element of the BFR message.

22. The UE of claim 19, wherein the one or more processors are further configured to:

determine, based at least in part on the BFR message, that the at least part of the BFR information has been transmitted based at least in part on the secondary cell index being included in the BFR message.

23. The UE of claim 13, wherein the BFR information is defined as a secondary cell index associated with the BFR.

24. The UE of claim 23, wherein the secondary cell index is included in a bitmap of the BFR message.

25. A non-transitory computer-readable medium storing one or more instructions for wireless communication, the one or more instructions comprising:

one or more instructions that, when executed by one or more processors of a user equipment (UE), cause the one or more processors to:

determine that a beam failure recovery (BFR) has been triggered;

determine, for a length of time corresponding to an evaluation period for identifying one or more candidate beams associated with the BFR and following detection of a beam failure associated with the BFR, BFR information associated with the BFR, wherein the length of time spans at least one opportunity for BFR message transmission during which uplink shared channel resources are available for transmission, and during the length of time, the UE skips transmission of a BFR message in response to at least one of: the BFR information having not changed relative to the BFR information most recently transmitted for a current beam failure recovery event, or the BFR information not yet being evaluated or determined based on the evaluation period; and transmit, after completion of the evaluation period and after determining the BFR information, the BFR message including the BFR information.

26. The non-transitory computer-readable medium of claim 25, wherein the transmission of the BFR message including the BFR information is further based at least in part on the uplink shared channel resources available for a new transmission having a size at least equal to a combined size of the BFR message and a subheader of the BFR message.

27. The non-transitory computer-readable medium of claim 26, wherein the BFR message comprises a truncated BFR message.

28. The non-transitory computer-readable medium of claim 25, wherein the transmission of the BFR message including the BFR information is further based at least in part on the BFR having been triggered and not cancelled.

29. The non-transitory computer-readable medium of claim 25, wherein the BFR has been triggered for one or more secondary cells of the UE.

30. The non-transitory computer-readable medium of claim 25, wherein the BFR information includes a candidate beam availability indication for one or more secondary cells indicated in a bitmap of the BFR message.

31. An apparatus for wireless communication, comprising:

means for determining that a beam failure recovery (BFR) has been triggered;

means for determining, for a length of time corresponding to an evaluation period for identifying one or more candidate beams associated with the BFR and following detection of a beam failure associated with the BFR, BFR information associated with the BFR, wherein the length of time spans at least one opportunity for BFR message transmission during which uplink shared channel resources are available for transmission, and during the length of time, the apparatus skips transmission of a BFR message in response to at least one of: the BFR information having not changed relative to the BFR information most recently transmitted for a current beam failure recovery event, or the BFR information not yet being evaluated or determined based on the evaluation period; and means for transmitting, after completion of the evaluation period and after determining the BFR information, the BFR message including the BFR information.

32. The apparatus of claim 31, wherein the transmission of the BFR message including the BFR information is further based at least in part on the uplink shared channel resources available for a new transmission having a size at least equal to a combined size of the BFR message and a subheader of the BFR message.

33. The apparatus of claim 32, wherein the BFR message comprises a truncated BFR message.

34. The apparatus of claim 31, wherein the transmission of the BFR message including the BFR information is further based at least in part on the BFR having been triggered and not cancelled.

35. The apparatus of claim 31, wherein the BFR is for one or more secondary cells of the apparatus.

* * * * *